United States Patent [19]

Koike

[11] Patent Number: 4,607,454

[45] Date of Patent: Aug. 26, 1986

[54] METHOD OF HYDROPONICALLY GROWING PLANT SPROUTS AND APPARATUS THEREFOR

[76] Inventor: Yujiro Koike, 115, Tenma-cho, Hamamatsu-shi, Shizuoka-ken, Japan, 430

[21] Appl. No.: 497,650

[22] Filed: May 24, 1983

[30] Foreign Application Priority Data

May 24, 1982 [JP] Japan .................................. 57-87537
Aug. 12, 1982 [JP] Japan ............................ 57-123614[U]

[51] Int. Cl.⁴ .............................................. A01G 31/00
[52] U.S. Cl. ............................................ 47/63; 47/61
[58] Field of Search .................... 47/60, 61, 62, 63, 64, 47/65, 59, 73, 41.12, 77

[56] References Cited

U.S. PATENT DOCUMENTS

| | | | |
|---|---|---|---|
| D. 236,364 | 8/1975 | Fox | 47/63 |
| 2,602,268 | 7/1952 | Baker | 47/73 |
| 4,037,360 | 7/1977 | Farnsworth | 47/63 |
| 4,058,931 | 11/1977 | Vestergaard | 47/64 |
| 4,299,054 | 11/1981 | Ware | 47/81 |
| 4,312,152 | 1/1982 | Drury et al. | 47/63 |

FOREIGN PATENT DOCUMENTS

| | | | |
|---|---|---|---|
| 3049576 | 7/1982 | Denmark | 47/77 |
| 234040 | 4/1969 | Greece | 47/63 |

Primary Examiner—Robert A. Hafer
Assistant Examiner—Bradley M. Lewis
Attorney, Agent, or Firm—Darby & Darby

[57] ABSTRACT

A floating bed useful for hydroponically germinating seeds of a plant and growing the germinated sprouts thereon. The floating bed is floatable by itself on water and includes a pad formed of a hydrophobic material such as foamed polystyrene and provided with one or more through holes. The through holes have a size so that it can continually retain water therein by capillary attraction during the float of the bed on water. The seeds are placed on the pad and the floating bed is floated on the surface of water to allow the seeds to germinate and the germinated sprouts to grow with the roots thereof passing through the through holes.

15 Claims, 8 Drawing Figures

METHOD OF HYDROPONICALLY GROWING PLANT SPROUTS AND APPARATUS THEREFOR

BACKGROUND OF THE INVENTION

This invention relates to a method and an apparatus for hydroponically growing plant sprouts.

There are known a lot of methods for growing plant sprouts in soilless media. Hydroponics is one such method in which a plant is supported by a bed disposed on or above the surface of water, optionally containing nutrients, with the roots of the plant passing through the bed and extending into the water. Several beds for hydroponics have thus far been proposed such as (a) shaped bodies, such as plates and trays, formed of a close celled, synthetic polymeric foam material, (b) shaped bodies prepared by molding a mixture of close celled, synthetic polymeric foam particles and a vegetable organic material, (c) plates formed of a mixture of a close celled, synthetic polymeric foam particles, open celled, synthetic polymeric foam particles and scrabs, and (d) perforated sheets or wire nets mounted on buoyant frames. These hydroponic beds, however, are not quite satisfactory in practice.

The bed of the aforementioned type (a) has a very small bulk density and is floatable by itself. However, since the floatable shaped body per se has no water permeability, it is not possible to sow seeds of a plant directly thereon for germination. Thus, the shaped body is processed to form relatively large perforations or apertures on which seedlings are transplanted. Alternatively, the perforations are covered with water absorbent materials such as pebbles, sand, and peat moss, in which seeds are sowed. In either case, it is not easy to maintain a suitable humid growing environment throughout their growth.

The second, type (b) bed is suited for the germination of rice seeds. Since the vegetable organic material, which serves both as a binder for the shaped bodies and a fertilizer for the plant, is soluble in water, they are broken upon harvesting and cannot be reused.

In the hydroponic plate of type (c), the close celled foam particles serve to provide the plate with flotage, while the scrabs and the open celled foam particles serve as a water absorbent. The scrabs additionally function as a fertilizer for the growth of the plant. Thus, the mixing ratio of respective components is very important in that it has a great influence upon the moisture environment necessary for the germination of seeds and the growth of the germinated sprouts. Although the availability of the three components as waste materials is one of the merits of the type (c) bed, the use of waste materials makes it difficult to adjust the mixing ratio to a predetermined range because of the lack of uniformity in quality of the waste materials. Moreover, with the type (c) bed, the roots of sprouts extend into the pores of the open celled foam particles and the softened portions formed by the rot of the scrabs and entwine with each other. In harvesting, therefore, the matured sprouts are cut near the roots and the roots remaining in the bed must be allowed to rot in order to reuse the bed. In addition, because the type (c) bed, which contains scrabs and rot roots, is liable to become infected by germs, it is not suited for the culture of clean plant sprouts which are generally eaten as raw. For the same hygienical reason, the type (c) bed is not suited for indoor use, especially of homes.

The bed of the above-described type (d) is designed so that when it is floated on the surface of water, the pad of a perforated sheet or wire net is positioned just above the level of the water. Seeds of a plant are spread on the pad for germination. In this case, although the distance between the pad and the surface of water is maintained substantially unchanged at an early stage of growth of the sprouts, the pad will be submerged as the sprouts grow higher, i.e. with the increase in weight of the sprouts. Therefore, it becomes necessary to lift the bed on a suitable support to keep the sprouts in a suitable growing environment.

SUMMARY OF THE INVENTION

It is, therefore, an object of the present invention to provide a floating bed for hydroponically growing plant sprouts which is free of the defects of the conventional beds.

Another object of the present invention is to provide a floating bed of the above-mentioned type which permits easy harvest without leaving any roots of the plant therein and can be reused immediately after the harvest.

It is a further object of the present invention to provide an inexpensive, easy to produce floating bed with which the growth of plant sprouts can be effected without need of specific controls such as watering, spraying and water level adjustment.

It is yet a further object of the present invention to provide a method which is especially suited for the cultivation of fresh, clean vegetables, such as Japanese radish sprouts and *Adenophora remotiflora Miq.*

In accomplishing the foregoing objects, there is provided in accordance with the present invention a floating bed for hydroponically growing plant sprouts, which includes a pad having a three dimensional structure with its opposite sides being substantially parallel with each other. The pad is formed of a substantially hydrophobic material and is provided with one or more through holes or apertures each extending between and in direction substantially vertical to the opposite sides to define a roots grow passage therein. Each of the passages has such a size as to provide capillary attraction. The floating bed is adopted to float on water with the opposite, top and bottom sides of the pad being positioned substantially in parallel with the horizontal plane so that each roots grow passage can always retain water therein during the float of the bed on water.

In another aspect, the present invention provides a method of germinating seeds of a plant and growing the germinated sprouts with the use of the above-described floating bed.

BRIEF DESCRIPTION OF THE DRAWINGS

Other objects, features and advantages of the present invention will become apparent from the detailed description of the preferred embodiments of the present invention which follows, when considered in light of the accompanying drawings, in which.

DESCRIPTION OF THE PREFERRED EMBODIMENTS

Figure 1:
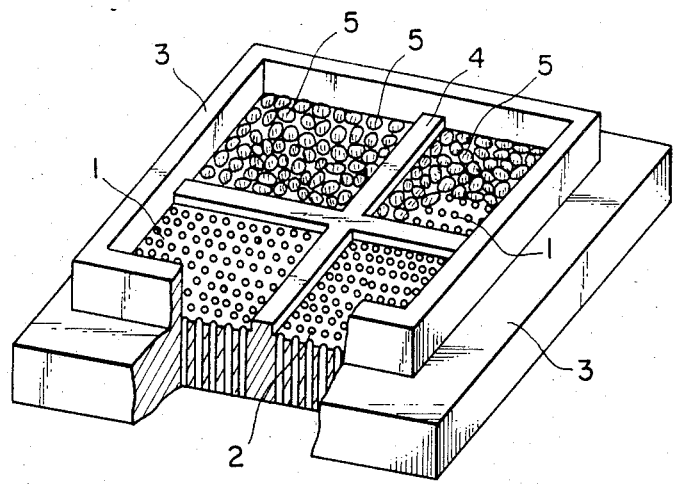
FIG. 1 is a perspective view, cut away in part, schematically showing one embodiment of the floating bed according to the present invention.

FIG. 1 depicts one embodiment of the floating bed of this invention, in which the reference numeral 1 denotes a pad formed of a close celled, synthetic polymeric foam material such as foamed polystyrene or foamed polyethylene and having top and bottom sides which are substantially parallel with each other. The thickness of the pad may vary according to the floatage of the foam material and the kind of the plant to be cultured.

The pad 1 is provided with one or more through holes 2 having a diameter so that each hole may attract water therein by capillary action. The diameter of each through hole is generally in the range of 0.5 to 3 mm. The number of the through holes 2 may also vary according to the kind of the plant and the object of the culture. When the floating bed is used for educational purposes, for example, rather than the consumption of the matured plant, the number of the holes can be very small. For the growth of Japanese radish sprouts, the pad is generally provided with about 500 to 1000 through holes with a diameter of 0.5 to 3 mm per 100 $cm^2$ of the pad. In the specific embodiment shown, which is arranged to grow Japanese radish sprouts, the pad has a thickness of 2 cm, an area of 225 $cm^2$ (15×15 cm) and a weight of 15 g. The pad is divided into four zones each having an area of 25 $cm^2$ (5×5 cm) and each provided with 144 (12×12) of evenly distributed through holes each having of diameter of 2 mm and arranged in a honeycomb structure. As described hereinafter, the through holes serve to function as the passages of plant roots.

Indicated as 3 is a frame member for supporting the pad therein. The frame member 3 is provided with an X-shaped insertion 4 dividing the pad into the four zones. Both of the frame member 3 and the insertion 4 supporting the pad 1 in this embodiment are also formed of the same close celled, synthetic polymeric material as the pad 1 and, thus, serve as a buoyant member for the pad 1.

When the floating bed having the above-described construction is placed on water, it floats by itself on the surface of water with the bottom side thereof positioning below the level of the water. The floating bed of this embodiment is so designed that the bottom side thereof is submerged to the depth of 2 mm from the water level and that a load of 300 g is required for positioning the top side thereof in parallel with the water level. Since the total weight of Japanese radish sprouts matured in the whole area of the pad generally amouts to 200 to 250 g, the floating bed has a sufficient capacity for supporting the sprouts thereon while maintaining the top side thereof above the water level.

A method of growing sprouts from seeds to maturity with the use of the floating bed according to the present invention is now described below with reference to FIGS. 2(a) through 2(d). Seeds 5 are placed on the pad 1 and sufficiently applied with water by, for example, submerging the floating bed under the level of water contained in a tray 6. The water in the tray 6 may, if necessary, contain suitable nutrients. By the application of water, the seeds are wetted and set adjacent to the mouths of the through holes 2 and, at the same time, each of the through holes 2 of the pad 1 holds an amount of water due to capillary phenomenon. By allowing the floating bed to float on the water in the tray 6 (FIG. 2(a)), each of the through holes 2 can continually retain a quantity of water therein because of the capillary attraction so that there is established in each through hole a humid environment suitable for the germination. In sowing, if the size of the seeds is smaller than that of the through holes 2, it is advisable to cover the pad with a paper towel or a tissue paper, upon which the seeds are sowed.

Figure 2A:
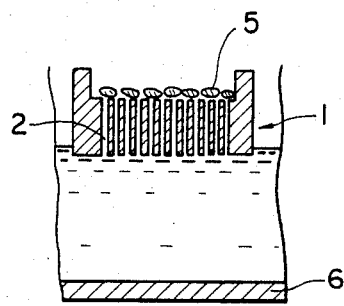
FIGS. 2(a) through 2(d) are elevational, cross-sectional views schematically showing the method in which the floating bed of this invention is used for placing seeds of a plant, sprouting the seeds and growing the plant sprouts to maturity.
Figure 2B:
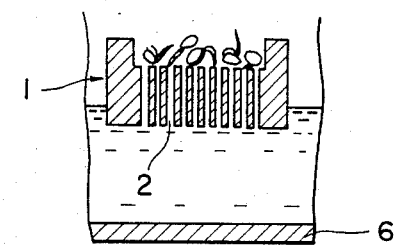
Figure 2C:
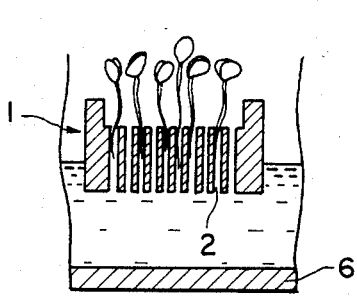
Figure 2D:
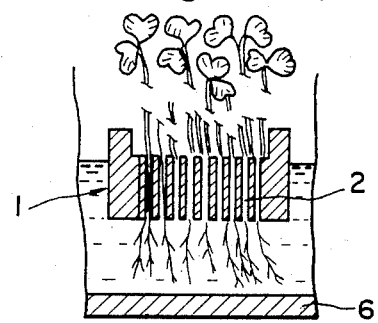

By controlling light, temperature and other growing conditions in the customarily employed manner, the germinated sprouts, which are provided with sufficient oxygen and adequate humidity, gradually grow with the roots growing from the end portions of the stems (or stalks) and extending through the through holes (FIGS. 2(b) and 2(c)). The roots further grow and emerge through the bottom of the pad to absorb nutrients. Thus, the sprouts grow further with the end portion of each of their stems being supported within respective through holes (FIG. 2(d)).

In general, the germination of seeds and the growth of the germinated sprouts are adversely affected by, on one hand, drying and, on the other hand, by excess moisture. These are main causes for the retard of germination and non-uniform growth of the sprouts. With the use of the floating bed in accordance with the present invention, the humid environment once established in each of the through holes at the time of sowing can be maintained unchanged throughout the germination of seeds and the growth of the germinated sprouts, provided that the tray 6 contains water medium in an amount sufficient to allow the float of the bed. That is, the sprouts can be continually provided with an adequate degree of moisture through the roots grow passages without the need of watering and spraying. This contributes much to the reduction of manual labor.

As illustrated in FIGS. 2(a) through 2(d), the distance between the top side of the pad and the surface of water in the tray 6 gradually decreases with the growth of the sprouts, i.e. with the increase in weight of the sprouts. Since the floating bed has a sufficient thickness and a flotage, however, the humidity at the top side of the pad is kept constant irrespective of the growth stage of the sprouts. Thus, in accordance with the method of this invention, plant sprouts can be grown to mature in a stable manner because the capillary attraction in the roots grow passages defined by the through holes and the flotage of the bed constantly produce a moderate humid environment. Therefore, the present invention makes it possible to grow *Adenophora remotiflora Miq.* with an improved germination rate.

The matured sprouts may be exposed to light for greening before harvesting. Since the roots of one sprout do not entwine with other sprouts in the pad, the roots of each sprout can be easily pulled off from the pad without leaving the root tips in the through holes. Thus, upon harvest, the floating bed is ready for reuse. In home culture, the pad may be divided into a plurality of regions with respective regions being sowed in different days. This makes it possible to daily harvest and consume fresh sprouts with one floating bed. The provision of the previously described X-shaped insertion is conveniently employed to achieve this purpose.

Figure 3A:
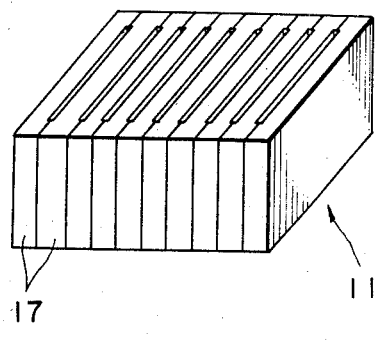
FIGS. 3(a) and 3(b) are perspective views schematically showing another embodiment of the pad according to the present invention.
Figure 3B:
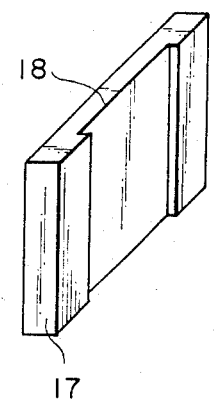

The floating bed of the present invention may be modified in a variety of constructions. FIGS. 3(a) and 3(b) show an alternate embodiment of the present invention, in which the pad 11 is formed of a plurality of plate elements 17. Each element 17 has a recessed portion 18 so that, when they are integrally bonded face to face, slits 12 are defined therebetween. The slits serve as roots grow passages likewise the through holes 2 of FIG. 1. The width of each slit 12 may generally be in the range of 0.5 to 3 mm.

Figure 4:
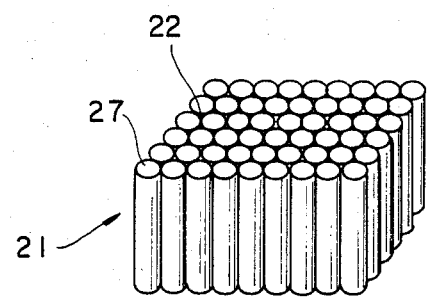
FIG. 4 is a perspective view schematically showing an alternate embodiment of the pad according to the present invention.

In the embodiment shown in FIG. 4, the pad 21 is formed from a plurality of rods 27 each generally circular in cross section. The rods 27 are integrally bound together so that a plurality of voids 22 extending along the length of the rods 27 are defined between them. The voids 22 serve as the roots grow passage of the pad 21. In this case, at least one of the rods 27 can be formed into a cylinder so that the center hole of the cylinder can serve as at least part of the roots grow passages.

The pads shown in FIGS. 1, 3 and 4 can be used by themselves without the support by a frame member. When the pad is used in combination with the frame member, the latter is generally formed of a close celled, synthetic polymeric foam material so that the frame can function as buoyant member of the bed. In this case, the pad may be formed of a material other than the close celled, synthetic polymeric foam material.

The floating bed according to the present invention has a very simple structure and is very effective in hydroponically growing a variety of plants. By varying the size and thickness of the pad, the floating bed can be used in various manners such as on a large scale industrial production of plant sprouts, for home culture and for educational purposes. The floating bed may be used in trays, ponds, rivers, lakes, bags, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A bed for floating on water for use in hydroponically growing plant sprouts, comprising:
    a substantially hydrophobic pad having a top surface and a bottom surface;
    said pad having a plurality of substantially straight through holes each extending vertically through said pad from said top surface to said bottom surface to define a plurality of closely spaced root growth passages therein, said pad having on the order of 500 to 1000 holes per 100 square centimeters,
    each root growth passage having a diameter in the range of 0.5 to 3 mm so as to provide substantial capillary attraction, and
    wherein an end of each said through hole is in contact with said water so that each passage can continually retain water therein when said bed is floating on said water.

2. A floating bed as set forth in claim 1, wherein said pad is formed of a close celled, synthetic polymeric foam material.

3. A floating bed as set forth in claim 1, further comprising an outer frame member provided around the circumference of said pad for supporting said pad thereon.

4. A floating bed as set forth in claim 3, wherein said pad is formed of a close celled, synthetic polymeric foam material.

5. A floating bed as set forth in claim 3, wherein said outer frame member is formed of a close celled, synthetic polymeric foam material.

6. A floatable bed as set forth in claim 5, wherein said pad includes two or more plates face to face with each other, each plate having recessed portions so as to define said root growth passages between said plates.

7. A floating bed as set forth in claim 5, wherein said pad includes a plurality of rods extending generally vertically and side by side each of which is substantially circular in cross section, outer surfaces of said rods defining spaces between said rods extending along the length of said rods, said spaces serving as said root growth passage.

8. A floating bed as set forth in claim 7, wherein at least one of said rods has an axial through bore so that said rod is substantially a tube, the bore of said rod having a diameter so as to serve as a root growth passage.

9. A floating bed as set forth in claim 3, further comprising an X-shaped insertion with respective ends being connected to said outer frame member for partitioning said pad into four regions of generally the same area.

10. A method of germinating plant seeds and hydroponically growing the germinated sprouts, comprising the steps of:
    floating a flatable bed on water, said floatable bed including a substantially hydrophobic pad having a top surface and a bottom surface, said pad having a plurality of substantially straight through holes each extending vertically through said pad from said top surface to said bottom surface to define a plurality of root growth passages therein, said pad having on the order of 500 to 1000 holes per 100 square centimeters, each passage having such a diameter so as to provide substantial capillary attraction, said diameter being in the range of 0.5 to 3 mm, and said floatable bed being constructed to float on water with an end of each said through hole in contact with said water so that each passage can continually retain water therein while said bed floats on water,
    sowing the seeds on said pad, and
    allowing the seed to germinate and the germinated sprouts to grow with the roots of each sprout passing through one of said passages and extending into the water.

11. The method as set forth in claim 10, wherein said sowing includes placing said seeds directly on said pad and adjacent to upper ends of said passages.

12. A method as set forth in claim 10, wherein said sowing includes covering the surface of said pad with an absorbent material, and placing the seeds on said absorbent material.

13. A method as set forth in claim 12, wherein said absorbent material is a paper sheet.

14. A method as set forth in claim 12, wherein said absorbent material is an open celled polyurethane foam sheet.

15. The method as set forth in claim 10, wherein said water contains added nutrients.

* * * * *